United States Patent [19]
Baba et al.

[11] Patent Number: 4,925,737
[45] Date of Patent: May 15, 1990

[54] LAMINATED STRUCTURE

[75] Inventors: Tsuyoshi Baba, Osaka; Akio Takigawa, Nishinomiya; Naoto Hirayama, Takarazuka; Motoaki Yoshida, Kawanishi, all of Japan

[73] Assignee: Nippon Sheet Glass Co., Ltd., Osaka, Japan

[21] Appl. No.: 281,254

[22] Filed: Dec. 7, 1988

[30] Foreign Application Priority Data

Dec. 11, 1987 [JP] Japan ................. 62-313626

[51] Int. Cl.$^5$ .............. B32B 17/10; B32B 27/42; B32B 27/08
[52] U.S. Cl. ................. 428/437; 428/447; 428/480
[58] Field of Search ............ 428/480, 447, 437

[56] References Cited

U.S. PATENT DOCUMENTS

| | | | |
|---|---|---|---|
| 4,112,171 | 9/1978 | Motter et al. | 428/213 |
| 4,242,403 | 12/1980 | Mattimoe et al. | 428/213 |
| 4,469,743 | 9/1984 | Hiss | 428/213 |

FOREIGN PATENT DOCUMENTS 1433532 8/1973 United Kingdom .
1438779 8/1973 United Kingdom .

Primary Examiner—George F. Lesmes
Assistant Examiner—Elizabeth M. Cole
Attorney, Agent, or Firm—Wenderoth, Lind & Ponack

[57] ABSTRACT

A laminated structure comprising a polyester film and a polyvinylbutyral sheet which are laminated through an adhesive layer obtained by curing a composition comprising an amino group-containing organosilicon compound of the following formula

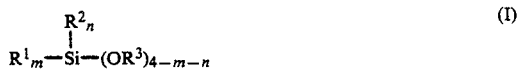

preferably its hydrolytic condensation product and a diamine of the formula

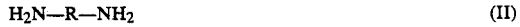

All symbols in these formulae are as defined in the specification. The structure is particularly useful in an automobile safety glass.

16 Claims, No Drawings

LAMINATED STRUCTURE

BACKGROUND OF THE INVENTION

1. Field of the Invention

This invention relates to a laminated structure useful in a safety glass comprising a glass layer and a plastic layer laminated to each other. The safety glass is used, for example, as a windshield of an automobile and a windowpane of a building.

2. Description of the Prior Art

Attempts have long been made to use a laminated structure comprising a sheet glass, a polyvinylbutyral sheet bonded to the inside surface of the glass sheet and a polyester film bonded further to the inside surface of the polyvinylbutyral sheet as an automobile windshield glass. The advantage of using this laminated structure as a windshield is that in the event of an automobile accident, the object with which the head and face of a driver collide directly is a relatively soft resin layer, and the degree of injury to the head and face is much lower than that in the case of collision with a laminated glass windshield. However, since the outermost layer of this laminated structure is a resin, it is weak to scratching and the application of a strong force will distort the polyvinylbutyral layer and cause a viewing distortion. Attempts are made to eliminate these defects by providing a hard coat on the surface of the polyester film to increase its scratch resistance and adjusting the thicknesses of the polyvinylbutyral sheet, the polyester film and the sheet glass to proper values to provide resistance to distortion.

To ensure sufficient holding of windows of an automobile in a colliding accident, a moderate degree of adhesion strength is required between the window and the body, between the glass and the polyvinylbutyral sheet and between the polyvinylbutyral sheet and the polyester film. It is particularly difficult however to increase the adhesion strength between the polyvinylbutyral sheet and the polyester film, and much research has been conducted in this regard.

Generally, flame treatment, corona discharge treatment, ultraviolet treatment, plasma treatment, alkali treatment and treatment with various chemicals are known as a method of improving the adhesion of a polyester film.

Japanese Laid-Open Patent Publications Nos. 46717/1975, 19314/1978 and 219053/1985 and Japanese Patent Publication No. 37155/1983 propose methods in which the surface of a polyethylene terephthalate film is subjected to a flame treatment. Japanese Laid-Open Patent Publication No. 176831/1987 propose a method of improving adhesion by providing a titanium dioxide between the polyester film and the polyvinylbutyral sheet.

It is known that the surface characteristics of a polyester film are improved by using an amino group-containing organosilicon compound of general formula (I) or a diamine of general formula (II) which are used in this invention [see, for example, Japanese Patent Publication No. 16344/1985, Papers Read in the 30th Meeting of Polymer Research (Kobe), page 34, and Collection of Articles on Polymers, vol. 35, 229 (1978)]. Japanese Patent Publication No. 16344/1985 proposes a method of improving the adhesion between a polyester film and an organopolysiloxane compound layer by using an adhesive composed of a mixture of 3-(2-aminoethylamino)-propyltrimethoxysilane and an epoxy resin. The above-cited Papers Read in the 30th Meeting of Polymer Research (Kobe), page 34 proposes a hexamethylenediamine as a surface-treating agent for polyester films. The above-cited Collection of Articles on Polymers, vol. 35, 229 (1978) proposes hydrazine as a surface-treating agent for polyester films.

However, with the flame treatment, the corona discharge treatment, the use of a surface-treating agent composed only of hexamethylenediamine and the use of a surface-treating agent composed only of hydrazine in the prior art, no sufficient results have been obtained with regard to the adhesion strength.

With the use of the mixture of 3-(2-aminoethylamino)-propyltrimethoxysilane and an epoxy resin and the alkali treatment, it is necessary to perform the curing reaction or the treatment for as long as several tens of minutes for obtaining sufficient adhesion. Accordingly, these methods have very low productivity, and incur a high cost.

Moreover, the flame treatment, corona discharge treatment, plasma treatment and alkali treatment undesirably result in a reduction in film strength.

SUMMARY OF THE INVENTION

The present inventors made extensive investigations in order to eliminate these defects of the prior art, and have now found that in a laminated structure of a polyester film and a polyvinylbutyral sheet, the adhesion between the laminated layers can be improved with good productivity by providing a layer of a specific organic compound between the polyester film and the polyvinylbutyral sheet.

According to this invention, there is provided a laminated structure comprising (A) a layer comprising a polyester resin, (B) an adhesive layer resulting from curing of a composition comprising (i) an amino group-containing organosilicon compound represented by the following general formula (I)

wherein $R^1$ represents an organic group having a primary amino group at the end and a hydrocarbon group, preferably an organic group having a primary amino group at the end and an acyclic hydrocarbon group, more preferably an alkyl group which may have a functional group in its molecular chain, much more preferably an alkyl group which may contain a functional group selected from —NH—, —S—, —CO—, —COO— and —C≡C— in its molecular chain, most preferably a group selected from —$(CH_2)_aNH_2$, —$(CH_2)_bNH(CH_2)_cNH_2$, —$(CH_2)_dNHCONH_2$, —$(CH_2)_eNH(CH_2)_fNH(CH_2)_gNH_2$, and —$(CH_2)_hS(CH_2)_iNH_2$, above all —$(CH_2)_aNH_2$ or —$(CH_2)_bNH(CH_2)_cNH_2$, in which a is an integer of 1 to 6, preferably 2 to 4, and b, c, d, e, f, g and h, independently from each other, represent an integer of 1 to 4, preferably 2 to 3;

$R^2$ represents an alkyl group having 1 to 6 carbon atoms, preferably 1 to 2 carbon atoms, or a phenyl group;

R³ represents an alkyl group having 1 to 6 carbon atoms, preferably 1 to 3 carbon atoms, an alkoxyalkyl group having 1 to 6 carbon atoms, preferably 1 to 3 carbon atoms, or an acetyl group; m represents 1 or 2, preferably 1, and n represents 0 or 1, preferably 0, or its hydrolytic condensation product, and (ii) a diamine represented by the following general formula (II)

$$H_2N-R-NH_2 \quad (II)$$

wherein R represents a direct bond or an alkylene group having 1 to 12 carbon atoms, preferably the alkylene group; or a phenylene group, the proportion of the organosilicon compound of general formula (I) being 10 to 100% by weight, preferably 20 to 90% by weight, more preferably 50 to 90% by weight, most preferably 70 to 90% by weight, based on the total weight of the organosilicon compound and the diamine of general formula (II), and (C) a layer comprising polyvinylbutyral, the layers (A), (B) and (C) being laminated in this sequence.

A polyester film having a thickness of 10 to 500 micrometers is preferably used as the layer (A) comprising a polyester resin. This polyester film may be, for example, a biaxially stretched film of a saturated polyester such as polyethylene terephthalate or polybutylene terephthalate.

The layer (C) comprising a polyvinylbutyral resin used in this invention is preferably a polyvinylbutyral sheet having a thickness of 300 to 1,500 micrometers. The polyvinylbutyral sheet may contain plasticizers such as triethylene glycol di-2-ethylbutyrate, dihexyl adipate, triethylene glycol di-n-heptanoate, tetraethylene glycol di-n-heptanoate and propylene oxide oligomers and mixtures of these and other plasticizers known in the art.

Examples of the amino group-containing organosilicon compounds of formula (I) used in the layer (B) in this invention include 3-aminopropyltrimethoxysilane, 3-aminopropyltriethoxysilane, 3-aminopropylmethyldimethoxysilane, 3-aminopropylmethyldiethoxysilane, 2-(2-aminodiethylthio)-ethyltriethoxysilane, 2-(2-aminoethylthio)-ethyldiethoxymethylsilane, 3-(2-aminoethylamino)-propyltrimethoxysilane, 3-(2-aminoethylamino)propyldimethoxymethylsilane, N-(3-triethoxysilylpropyl)urea, and 3-[2-(2-aminoethylamino)-ethylamino]-propyltrimethoxysilane. They may be used either singly or in combination.

Examples of the amine of general formula (II) used in the layer (B) in this invention are hydrazine, trimethylenediamine, tetramethylenediamine, hexamethylenediamine, dodecamethylenediamine and phenylenediamine. They may be used singly or in combination.

The mixing ratio between the organosilicon compound of general formula (I) and the diamine of general formula (II) is such that the proportion of the organosilicon compound of general formula (I) is 10 to 100% by weight, preferably 20 to 90% by weight, more preferably 50 to 90% by weight, most preferably 70 to 90% by weight, based on the total weight of the organosilicon compound and the diamine of general formula (II). If the proportion of the organosilicon compound of general formula (I) is less than 10% by weight, the adhesion strength between the layers (A) and (C) is lowered. If it exceeds 95% by weight, the above adhesion strength at low temperatures is reduced.

The layer (B) in this invention can be conveniently formed by preparing a solution containing the organosilicon compound of general formula (I) and the diamine of general formula (II), coating the solution on one surface of the layer (A), and curing the coating under heat. A water-soluble organic solvent such as methanol, ethanol, isopropanol, butanol, acetone, methyl Cellosolve, ethyl Cellosolve, propylene glycol monomethyl ether or dipropylene glycol monomethyl ether or water may, for example, be used as a solvent for preparing the solution. The solvent may be applied by coating methods generally used, for example by roll coating, bar coating, dip coating, flow coating or spray coating. The curing of the coating on the layer (A) may be performed at 100° to 150° C. for 1 to 5 minutes. The thickness of the layer (B) is desirably not more than 1.0 micrometer.

The laminated structure of the invention can be obtained by laminating a polyvinylbutyral sheet to the layer (B) formed on the layer (A).

A glass laminated structure may be obtained by applying a glass sheet to the polyvinylbutyral sheet layer (C) of this laminated structure and treating the assembly under pressure at 40° to 150° C. for 10 to 60 minutes. To increase the adhesion of the glass to the polyvinylbutyral layer, the surface of the glass or the surface of the polyvinylbutyral layer to be bonded to the glass may be treated with a silane coupling agent.

Since the polyester film generally has a low surface hardness and poor scratch resistance, its surface hardness should be improved. This may be achieved by using an organosiloxane-type hard coating agent or an acrylic hard-coating which is generally known.

In a preferred embodiment of this invention, re is provided a laminated structure comprising (A) a layer comprising a polyester resin, (B) an adhesive layer resulting from curing of a composition comprising (i) a hydrolytic condensation product of an amino group-containing organosilicon compound represented by the following general formula (I)

wherein R¹, R², R³, m and n are as defined above, and (ii) a diamine represented by the following general formula (II)

$$H_2N-R-NH_2 \quad (II)$$

wherein R is as defined, the proportion of the organosilicon compound of general formula (I) being 10 to 95% by weight, preferably 20 to 90% by weight, more preferably 50 to 90% by weight, most preferably 70 to 90% by weight, based on the total weight of the hydrolytic condensation product of the organosilicon compound and the diamine of general formula (II), and (C) a layer comprising polyvinylbutyral, the layers (A), (B) and (C) being laminated in this sequence.

The hydrolytic condensation product of the amino group-containing organosilicon compound of general formula (I) can be obtained by adding a small amount of water to the amino group-containing organosilicon compound of general formula (I) and allowing hydrolysis to take place. The amount of water used in the hydrolysis is 0.01 to 10% by weight, preferably 0.05 to 8% by weight, more preferably 0.1 to 5% by weight. If the amount of water is less than 0.05% by weight, variations of adhesion among production lots are great and the adhesion is not so good. If it is larger than 10% by weight, the haze of the adhesive layer increases and becomes whitened.

With the laminated structure in accordance with the preferred embodiment of this invention, there is no variation in the adhesion strength of the layer (B) among lots, and a high adhesion strength can be obtained.

In the present invention, the adhesive layer (B) resulting from curing of a composition comprising the amino group-containing organosilicon compound of general formula (I) or its hydrolytic condensation product and the diamine of general formula (II) has good adhesion to both of the polyester film and the polyvinylbutyral sheet over a broad temperature range, and acts as an adhesion improving layer for the polyester film and the polyvinylbutyral sheet. Moreover, when the hydrolytic condensation product of the compound (II) is used, there is no variation in adhesion strength among lots.

Accordingly, when the laminated structure of the invention is used in a safety glass, a sufficient adhesion strength is imparted between the polyester film and the polyvinylbutyral sheet which are important in an automobile windshield glass for preventing injury to a human body at the time of collision. Thus, an automobile windshield glass of high safety can be obtained by the present invention.

The following Examples and Comparative Examples illustrate the laminated structure of the invention with reference to an adhesive layer resulting from the use of 3-aminopropyltriethoxysilane or 3-(2-aminoethylamino)propyltrialkoxysilane and hexamethylenediamine as examples. The invention, however, is not limited to these examples. In these examples, all parts and percentages are by weight.

EXAMPLES 1–5 AND COMPARATIVE EXAMPLES 1 AND 2

One part of distilled water was added to 100 parts of 3-aminopropyltriethoxysilane (A-1100), (a product of Japan Unicar Co., Ltd.), and the silane compound was hydrolyzed at 80° C. for 1 hour. The reaction product was mixed with hexamethylenediamine (HMDA for short) in the proportions shown in Tables 1 and 2. The mixture was dissolved in isopropanol to prepare a 2% solution. The solution was coated on the surface of a transparent polyethylene terephthalate film (T type, a product of Toray Inc.) having a thickness of 125 micrometers, and cured at 120° C. for 2 minutes. The resulting adhesive layer had a thickness of 0.005 to 0.05 micrometer. This polyethylene terephthalate film had been coated at the opposite surface with the organopolysiloxane-type hard coating agent described in Example 2 of Japanese Laid-Open Patent Publication No. 27740/1987. Then, a polyvinylbutyral sheet having a thickness of 380 micrometers was laid on the adhesive surface of the adhesive layer on the polyester film, and a glass sheet was laminated to that surface of the polyvinylbutyral sheet to which the polyester film was not bonded. The laminated structure was put in an autoclave and kept at 10 kg/cm$^2$ and 150° C. for 30 minutes.

The adhesion properties of the resulting structure were evaluated by the following methods.

Adhesion (1)

At a temperature of 23° C. and 0° C. respectively, the polyethylene terephthalate film was peeled off from the polyvinylbutyral sheet parallel to the surface of the glass sheet, and the strength of adhesion at this time was examined and rated as follows:

A: not peeled
B: peeled but with strong resistance
C: peeled without much resistance

Adhesion (2)

A 180° peel test was carried out at 23° C. and 0° C. respectively by an autograph (DCS-500 made by Shimadzu Seisakusho Co., Ltd.). The results are shown in Tables 1 and 2.

TABLE 1

| | Mixing proportion | | Adhesion (1) | |
|---|---|---|---|---|
| Run | Hydrolytic condensation product of A-1100 (%) | HMDA (%) | 23° C. | 0° C. |
| Example 1 | 100 | 0 | A | B |
| Comparative Example 1 | 0 | 100 | C | C |
| Comparative Example 2 | 0 | 0 | C | C |
| Example 2 | 50 | 50 | A | A–B |

TABLE 2

| | Mixing proportion | | Adhesion (1) (kg/25 mm) | |
|---|---|---|---|---|
| Run | Hydrolytic condensation product of A-1100 (%) | HMDA (%) | 23° C. | 0° C. |
| Example 1 | 100 | 0 | 4.0 | 0.8 |
| Example 2 | 50 | 50 | 4.5 | 1.4 |
| Example 3 | 80 | 20 | 4.5 | 1.5 |
| Example 4 | 20 | 80 | 4.5 | 1.5 |
| Example 5 | 10 | 90 | 4.2 | 1.0 |

COMPARATIVE EXAMPLE 3

A polyvinylbutyral sheet was laid over a corona-discharge treated surface of a polyester film (T-50 type, a product of Toray Inc.), and by the same procedure as above, a laminated structure was produced. The resulting structure showed an adhesion strength of 2 kg/25 mm at 23° C. and 0 kg/25 mm at 0° C.

EXAMPLES 6–9 AND COMPARATIVE EXAMPLE 4

The procedure of Examples 1 to 5 and Comparative Example 1 was repeated except that the silane compound (A-1100) was not hydrolyzed; the resulting laminate was not placed in the autoclave but maintained at 150° C. for 30 minutes in vacuum (less than 1 mmHg); and the 180° peel test was changed to a 90° peel test. The results are shown in Table 3.

TABLE 3

| | Mixing proportion | | Adhesion (1) (kg/25 mm) | |
|---|---|---|---|---|
| Run | A-1100 (%) | HMDA (%) | 23° C. | 0° C. |
| Example 6 | 100 | 0 | 3.0 | 0.5 |
| Example 7 | 80 | 20 | 4.3 | 0.7 |
| Example 8 | 50 | 50 | 2.7 | 0.6 |
| Example 9 | 20 | 80 | 2.1 | 0.2 |
| Comparative | 0 | 100 | 1.1 | 0.1 |

TABLE 3-continued

| | Mixing proportion | | Adhesion (1) (kg/25 mm) | |
|---|---|---|---|---|
| Run | A-1100 (%) | HMDA (%) | 23° C. | 0° C. |
| Example 4 | | | | |

EXAMPLES 10 AND 11

Examples 6 and 8 were repeated except that 3-(2-aminoethylamino)-propyltrialkoxysilane (A-1160) was used instead of A-1100. The results are shown in Table 4.

TABLE 4

| | Mixing proportion | | Adhesion (1) (kg/25 mm) | |
|---|---|---|---|---|
| Run | A-1160 (%) | HMDA (%) | 23° C. | 0° C. |
| Example 10 | 100 | 0 | 1.9 | 0.3 |
| Example 11 | 80 | 20 | 2.3 | 0.3 |

We claim:
1. A laminated structure comprising
(A) a layer comprising a polyester resin,
(B) an adhesive layer resulting from curing of a composition comprising
   (i) the hydrolytic condensation product of an amino group-containing organosilicon compound represented by the following general formula (I)

$$R^1{}_m\!-\!\underset{\underset{\displaystyle R^2{}_n}{|}}{Si}\!-\!(OR^3)_{4-m-n} \quad (I)$$

wherein:
R¹ represents an organic group having a primary amino group at the end and an acrylic hydrocarbon group;
R² represents an alkyl group having 1 to 6 carbon atoms or a phenyl group;
R³ represents an alkyl group having 1 to 6 carbon atoms, an alkoxyalkyl group having 1 to 6 carbon atoms, or an acetyl group; m represents 1 or 2, n represents 0 or 1,
and
   (ii) a diamine represented by the following general formula (II-a) or (II-b)

H₂N—NH₂     (II-a)

H₂N—R—NH₂     (II-b)

wherein R represents an alkylene group having 1 to 12 carbon atoms, or a phenylene group,
the proportion of the organosilicon compound of general formula (I) being 10 to 100% by weight based on the total weight of the organosilicon compound of general formula (I) and the diamine of general formulas (II-a) and (II-b), and
(C) a layer comprising polyvinylbutyral, the layers (A), (D) and (C) being laminated in this sequence.
2. The laminated structure of claim 1 in which R¹ represents an alkyl group which has a primary amino group at the end or an alkyl group which has a primary amino group and which contains a functional group in its chain.
3. The laminated structure of claim 1 in which R¹ represents an alkyl group which has a primary amino group at the end or an alkyl group which has a primary amino group and which contains a functional group selected from —NH—, —S—, —CO—, —COO— and —C=C— in its chain.
4. The laminated structure of claim 1 in which R¹ represents a group selected from —(CH₂)ₐNH₂, —(CH₂)ᵦNH(CH₂)ᵧNH₂, —(CH₂)ᵈNHCONH₂, O(CH₂)ₑNH(CH₂)ᶠNH(CH₂)ᵍNH₂, and —(CH₂)ₕS(CH₂)ᵢNH₂ in which a represents an integer of 1 to 6, and b, c, d, e, f, g and h, independently from each other, represent an integer of 1 to 4.
5. The laminated structure of claim 1 in which m is 1 and n is 0.
6. A laminated structure comprising
(A) a layer comprising a polyester resin,
(B) an adhesive layer resulting from curing of a composition comprising
   (i) a hydrolytic condensation product of an amino-containing organosilicon compound represented by the following general formula (I)

$$R^1{}_m\!-\!\underset{\underset{\displaystyle R^2{}_n}{|}}{Si}\!-\!(OR^3)_{4-m-n} \quad (I)$$

wherein:
R¹ represents an organic group having a primary amino group at the end and an acrylic hydrocarbon group;
R² represents an alkyl group having 1 to 6 carbon atoms or a phenyl group;
R³ represents an alkyl group having 1 to 6 carbon atoms, an alkoxyalkyl group having 1 to 6 carbon atoms, or an acetyl group; m represents 1 or 2, n represents 0 or 1, and
   (ii) a diamine represented by the following general formula (II-a) or (II-b)

H₂N—NH₂     (II-a)

H₂N—R—NH₂     (II-b)

wherein R represents an alkylene group having 1 to 12 carbon atoms, or a phenylene group,
the proportion of the organosilicon compound of general formula (I) being 10 to 95% by weight based on the total weight of the organosilicon compound and the diamine of general formula (II-a) and (II-b), and
(C) a layer comprising polyvinylbutyral, the layers (A), (B) and (C) being laminated in this sequence.
7. The laminated structure of claim 6 in which R¹ represents an alkyl group at the end which has a primary amino group or an alkyl group which has a primary group and which contains a functional group in its chain.
8. The laminated structure of claim 6 in which R¹ represents an alkyl group which has a primary amino group at the end or an alkyl group which has a primary amino group and which contains a functional group selected from —NH—, —S—, —CO—, —COO— and —C=C— in its chain.
9. The laminated structure of claim 6 in which R¹ represents a group selected from —(CH₂)ₐNH₂, —(CH₂)ᵦNH(CH₂)ᵧNH₂, —(CH₂)ᵈNHCONH₂, O(CH₂)ₑNH(CH₂)ᶠNH(CH₂)ᵍ NH₂, and —(CH₂)ₕS(CH₂)ᵢNH₂, in which a represents an integer of 1 to 6, and b, c, d, e, f, g and h, independently from each other, represent an integer of 1 to 4.

10. The laminated structure of claim 6 in which m is 1 and n is 0.

11. The laminated structure of claim 6 in which R is an alkylene group having 1 to 6 carbon atoms.

12. The laminated structure of claim 6 in which the amino group-containing organosilicon compound of general formula (I) is a 3-aminopropyltrialkoxysilane, a 3-(2-aminoethylamino)-propyltrialkoxysilane, a 2-(2-aminoethylthioethyl)-trialkoxysilane, a 3-[2-(2-aminoethylamino)ethylamino]-propyltrialkoxysilane or an N-(3-trialkoxysilylpropyl)-urea.

13. The laminated structure of claim 6 in which the layer (A) containing a polyester resin is a biaxially stretched film of polyethylene terephthalate having a thickness of 10 to 500 micrometers.

14. The laminated structure of claim 6 in which the layer (C) containing the polyvinylbutyral resin is a polyvinylbutyral sheet having a thickness of 300 to 1,500 micrometers.

15. The laminated structure of claim 6 which further comprises at least one glass sheet laminated to the outside surface of the layer (C) comprising the polyvinylbutyral resin which is opposite to the layer (B).

16. The laminated structure of claim 6 in which $R^1$ represents a group selected from $-(CH_2)_a NH_2$, or $-(CH_2)_b NH(CH_2)_c NH_2$, in which a represents an integer of 1 to 6, and b and c, independently from each other, represent an integer of 1 to 4.

* * * * *